June 9, 1925.
H. E. WEIR
ANTIFOULING TRAP VALVE
Filed July 30, 1924
1,541,540
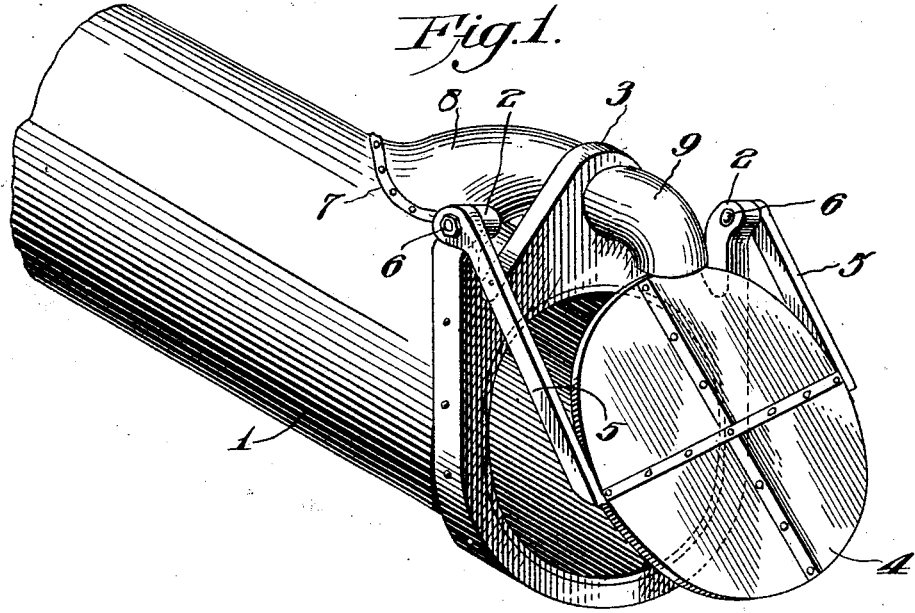
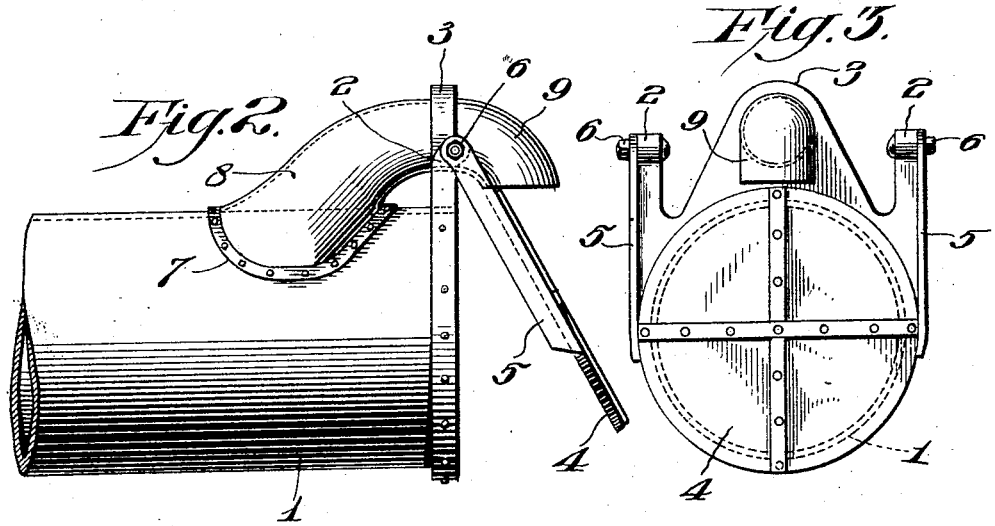
INVENTOR:
Harry E. Weir.
BY
ATTORNEYS.

Patented June 9, 1925.

1,541,540

UNITED STATES PATENT OFFICE.

HARRY E. WEIR, OF WILDWOOD, NEW JERSEY.

ANTIFOULING TRAP VALVE.

Application filed July 30, 1924. Serial No. 729,020.

*To all whom it may concern:*

Be it known that I, HARRY E. WEIR, a citizen of the United States, and residing in Wildwood, county of Cape May, and State of New Jersey, have invented a certain new and useful Antifouling Trap Valve, of which the following is a specification.

It is customary at sea-side and similar places to conduct storm water or sewage and like waste by conduit to the sea or other body of water, which conduit usually is provided at its discharge end with a flap or similar valve to prevent the water from backing up storm water or sewage within the conduit. It frequently happens that the ebb of the tide fouls such flap valve by washing sand and the like thereagainst, thus holding such valve closed.

The leading object of the present invention is to overcome this disadvantageous feature and provide means whereby the accumulation of storm water or sewage within the conduit, when the valve thereof is retained closed, functions to self-clear the flap-valve of fouling by passing through a by-pass connection and discharging downwardly, directly in advance of the flap valve to remove foreign matter and permit the valve to again open under the main storm water or sewage discharge. With this and other objects in view the invention consists of the novel construction hereinafter described and finally claimed.

The nature, characteristic features and scope of the invention will be more fully understood from the following description taken in connection with the accompanying drawings forming part hereof, and in which:

Fig. 1, is a perspective view of apparatus embodying features of the invention.

Fig. 2, is a view in side elevation, and

Fig. 3, is an end view of Fig. 2.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings, the reference numeral 1, designates a storm water or sewage conduit or pipe for conveying waste from a borough, township, city or the like to the ocean, or other body of water. The discharge end of the conduit has fitted thereover a support of substantially ring-like shape, provided upon its top, at each side with a lug 2 and terminating at its top, centrally thereof with an apertured extension 3. Having movable relation with respect to the conduit 1 is a flap valve 4. As shown in the drawings the valve is connected with respect to conduit support by means of rods 5 pivoted as at 6 to the lugs 2. The valve may, if desired, be braced by straps 7 arranged cross-wise across the outer face thereof. Such flap valve is normally maintained in open position by the discharge of storm water or sewage or the like, which position of parts is shown in Figs. 1 and 2. It frequently happens that the ebb of the tide washes up sand and other foreign matter thereby fouling the trap or in other words maintaining same in closed position and causing the sewage to back up in the conduit. I desire to avail myself of this backing of storm water or sewage and harness the same, so to speak, for self-clearing of the valve in its fouled or closed position. To this end I extend from the top of conduit 1, as at 7, a by-pass connection 8, which is forwardly extended upon a curved line and projected through the aperture of extension 3. The free end of the by-pass connection, thus projected, is curved downwardly as at 9, spout-fashion, so as to direct storm water or sewage downwardly immediately in front of the flap valve in its closed position. Thus as a valve is fouled and storm water or sewage backs up in the conduit, a part thereof is caused to egress through said by-pass connection; is directed to the foreign matter before the valve; and continued discharge thereof causes said foreign matter to be cleared of the valve sufficiently to permit the weight of confined storm water or sewage in the conduit to force outwardly the flap valve and re-establish normal working conditions, thereby providing a novel, inexpensive and self-clearing or anti-fouling flap valve for storm water or sewage conduits.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In apparatus of the character stated a storm water or sewage conduit, the discharge end of which has fitted thereover and fixed thereto a support, a flap valve pivoted to said support and normally maintained in open position by sewage discharge, and a by-pass connection in communication with said conduit and extended upwardly and forwardly upon a curved line from the top of said conduit and beyond the conduit discharge end the discharge mouth of said by-pass connection being arranged in a plane above the top of said conduit and being further arranged to deflect storm water or sewage downwardly in advance of said flap valve in its closed position.

2. In apparatus of the character stated a storm water or sewage conduit the discharge end of which has fitted thereover and fixed thereto a support having an upper extension, a flap valve provided with rods which latter are pivoted to said support and normally maintained in open position by sewage discharge, and a by-pass connection in communication with said conduit at its top, said by-pass connection being extended forwardly through said extension and deflected downwardly for storm water or sewage discharge in advance of said flap valve in the event of the latter being held in closed position by foreign substances.

3. In apparatus of the character stated a storm water or sewage conduit the discharge end of which has fixed thereto a support provided at its top with a pair of lugs and an opening arranged intermediate said lugs, a flap valve pivoted with respect to said lugs upon said support and normally maintained in open position by storm water or sewage discharge, and a by-pass connection in communication with said conduit at its top, said by-pass connection being extended forwardly through said opening in said support and deflected downwardly for storm water or sewage discharge in advance of said flap valve in the event of the latter being held in closed position by foreign substances.

In testimony whereof, I have hereunto signed my name.

HARRY E. WEIR.